(12) United States Patent
Pickersgill (10) Patent No.: US 10,606,084 B2
(45) Date of Patent: Mar. 31, 2020

(54) COLLAPSIBLE VIEWER FOR THREE-DIMENSIONAL, VIRTUAL REALITY, AND AUGMENTED REALITY CONTENT

(71) Applicant: Jason Pickersgill, Los Angeles, CA (US)

(72) Inventor: Jason Pickersgill, Los Angeles, CA (US)

(73) Assignee: Jason Pickersgill, Los Angeles, CA (US)

( * ) Notice: Subject to any disclaimer, the term of this patent is extended or adjusted under 35 U.S.C. 154(b) by 19 days.

(21) Appl. No.: 15/976,610

(22) Filed: May 10, 2018

(65) Prior Publication Data

US 2018/0329214 A1    Nov. 15, 2018

Related U.S. Application Data

(60) Provisional application No. 62/504,049, filed on May 10, 2017.

(51) Int. Cl.
| | | |
|---|---|---|
| *G02B 27/01* | (2006.01) | |
| *G02B 27/02* | (2006.01) | |
| *G02B 27/04* | (2006.01) | |

(52) U.S. Cl.
CPC ....... *G02B 27/0176* (2013.01); *G02B 27/028* (2013.01); *G02B 27/04* (2013.01); *G02B 2027/0159* (2013.01); *G02B 2027/0178* (2013.01)

(58) Field of Classification Search
CPC .. G02B 27/0176; G02B 27/028; G02B 27/04; G02B 27/022; G02B 2027/0159; G02B 2027/0178; G02B 2027/0132; H04N 5/2254; H04N 13/359; G03B 17/04; H04M 1/0214; H04M 1/0235; H04M 1/022

See application file for complete search history.

(56) References Cited

U.S. PATENT DOCUMENTS

| | | | | |
|---|---|---|---|---|
| 4,574,505 | A * | 3/1986 | Chiodo ................ | G02B 27/04 359/817 |
| 5,117,339 | A * | 5/1992 | Tortola .................. | A63F 13/02 362/109 |
| 5,307,209 | A * | 4/1994 | Iaquinto ............... | G02B 25/002 359/804 |
| 5,500,765 | A * | 3/1996 | Eichenlaub ........ | G02B 27/2214 359/463 |
| 5,867,140 | A * | 2/1999 | Rader ................... | G09G 5/363 345/98 |
| 8,814,447 | B1 * | 8/2014 | Hambergen .......... | G03B 17/04 396/348 |

(Continued)

*Primary Examiner* — Tom V Sheng
(74) *Attorney, Agent, or Firm* — Jonathan Pearce; SoCal IP Law Group LLP (57) ABSTRACT

A collapsible viewer that may be used, for example, for viewing augmented reality and virtual reality content on a mobile device. The viewer includes a case for engaging a mobile computing device and an integral set of two lenses capable of transitioning between a first collapsed position and a second extended position such that when the set of two lenses is in the first collapsed position, the set of two lenses is hidden with the case and when in the second extended position, the set of two lenses is positioned for viewing content displayed on the mobile computing device.

13 Claims, 7 Drawing Sheets

(56) References Cited

U.S. PATENT DOCUMENTS

| | | | | |
|---|---|---|---|---|
| 8,967,377 B2* | 3/2015 | Lebauer | ............... | B65D 81/02 |
| | | | | 206/320 |
| 9,405,126 B1* | 8/2016 | Margolin | ........... | G02B 27/2257 |
| 2008/0158506 A1* | 7/2008 | Fuziak | .............. | G02B 27/0172 |
| | | | | 351/158 |
| 2010/0289725 A1* | 11/2010 | Levine | .............. | G02B 27/2257 |
| | | | | 345/32 |
| 2015/0234189 A1* | 8/2015 | Lyons | ............... | G02B 27/0172 |
| | | | | 345/174 |
| 2017/0031165 A1* | 2/2017 | Costa | ................. | G02B 27/028 |
| 2017/0187855 A1* | 6/2017 | Hoellwarth | ......... | G02B 27/017 |
| 2017/0304721 A1* | 10/2017 | Manuel | ................ | A63F 13/25 |

* cited by examiner

COLLAPSIBLE VIEWER FOR THREE-DIMENSIONAL, VIRTUAL REALITY, AND AUGMENTED REALITY CONTENT

RELATED APPLICATION INFORMATION

This patent claims priority from U.S. provisional patent application No. 62/504,049 filed May 10, 2017 and entitled AUTOMATIC LOGIC DETECTION AND APPLICATION BASED UPON USER INPUT SHAPES.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to augmented and virtual reality. More particularly, this disclosure relates to a collapsible viewer for a mobile device for viewing three-dimensional, augmented reality and virtual reality content.

Description of the Related Art

Augmented reality (AR) and virtual reality (VR) content is growing in accessibility and popularity. One of the barriers to widespread adoption and use of AR and VR content by the public is market penetration of suitable AR and VR viewing devices. As has been recognized for some time, the most accessible AR and VR viewing device that is already available to the general public is the typical smart phone, tablet or similar mobile computing device.

These devices include high-resolution screens, relatively powerful processors capable of rendering three-dimensional objects in real-time, and are ubiquitous. Millions of such mobile computing devices are sold worldwide each year. Even delivery of VR and AR content to mobile computing devices is relatively straightforward because they typically have integrated wireless modems for cellular or similar data connectivity in addition to 802.11x wireless connections. The only real limitation is that the mobile devices do not have multiple displays and do not incorporate lenses suitable for focusing a user's eyes on separate displays (or portions of displays) to generate content that has the appearance of depth because two slightly-different perspectives are not presented, one to each eye, to thereby provide the experience of and augmented reality or virtual reality object.

Many have attempted to convert mobile devices into AR and VR content viewing devices. There exist devices such as the Samsung® Gear® which is a relatively expensive, but high-quality peripheral for the Samsung® S-series mobile phones. An owner of such a phone may insert his or her Samsung® S-series phone into the Gear® which incorporates lenses, additional sensors, and exterior buttons and controls; thereby converting that mobile device into a relatively high-quality VR and AR headset. However, the Gear® is somewhat expensive, and only usable by owners of certain Samsung® phones. Google® has a similar product, the Daydream® which is only compatible with certain Android® phones.

Other less-expensive devices exist, such as more general purpose VR and AR headsets that are suitable for use with any devices. Google® Cardboard® is one such device that is device agnostic, but provides a relatively low-tech experience. There are no additional sensors or controls, and it is, broadly speaking, merely a container for the device that puts it in a configuration to operate as a VR or AR headset.

There also exist so-called mini-headsets which may be, effectively, a pair of lenses, only. They may be held in the hand or otherwise affix at a pre-determined distance from the display of the mobile device. These are quite inexpensive, and generally relatively low quality. But, one still has to carry these lenses around in order to use them.

None of the available options is truly accessible or convenient. The full VR/AR headsets take up a great deal of space for those complex controls, extra sensors, and electrical connections. The Google® Cardboard®-like options take up a great deal of space. And, for the added effort, provide a relatively poor experience. The mini-headsets or lenses merely split and focus the user's vision. And, as a result, none of these headsets is commonly carried by an average user from place to place. This relegates AR and VR content viewing to a user's home or to an a-typical consumer, at the present time, who carries a VR or AR headset or other viewing device with him- or herself everywhere.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
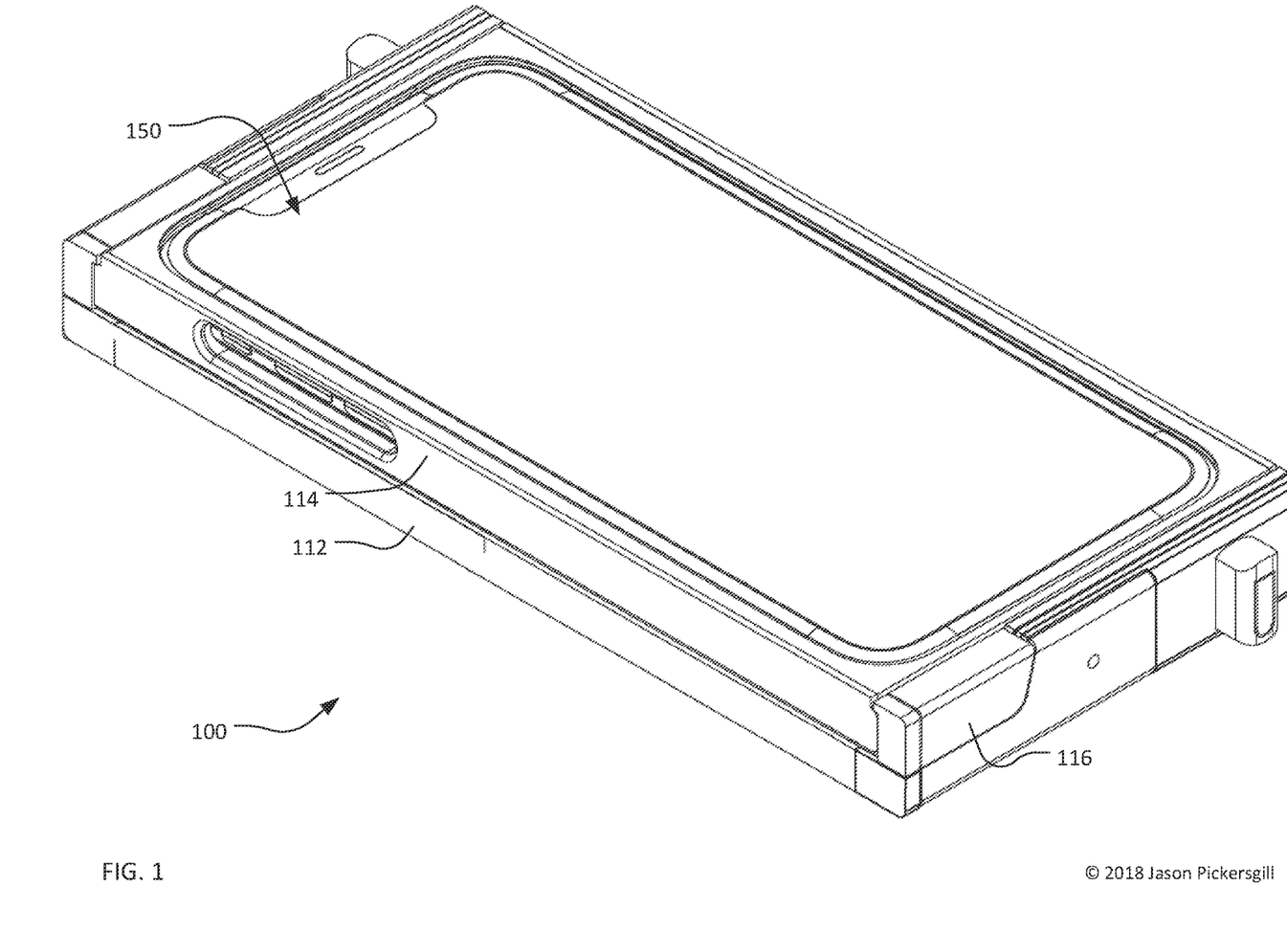
FIG. 1 is a perspective view of a collapsible viewer in a collapsed position.

Referring now to FIG. 1, a perspective view of a collapsible viewer 100 in a collapsed position is shown. The collapsible viewer 100 includes a case 112, a sliding tray 114, and a hinge 116 concealing a spring arm (discussed below). A mobile computing device 150 is shown housed within the sliding tray 114.

The mobile computing device 150 is shown as a mobile phone. However, the mobile computing device may be a tablet computer, a small personal computer, a laptop or any other computing device. As used herein the phrase mobile computing device 150 is meant to be a computer incorporating a processor, memory, and a display. The mobile computing device 150 may also include other systems such as speakers, a microphone, buttons, a touch-screen, and motion and positional sensors which may be used to provide orientation data related to the mobile computing device 150 that is used as an input to AR or VR content to update a user's position in the virtual or augmented reality world being displayed on the display.

The case 112 may cover some or all of the exterior of the mobile computing device 150. As shown in FIG. 1, the case 112 covers primarily the back of the mobile computing device 150, with the back being the side opposite of the primary display. The case 112 may provide drop and damage protection for the mobile computing device 150 housed within the case, or may be primarily decorative. However, the case 112 does generally conceal and protect the lenses, discussed below.

Figure 2:
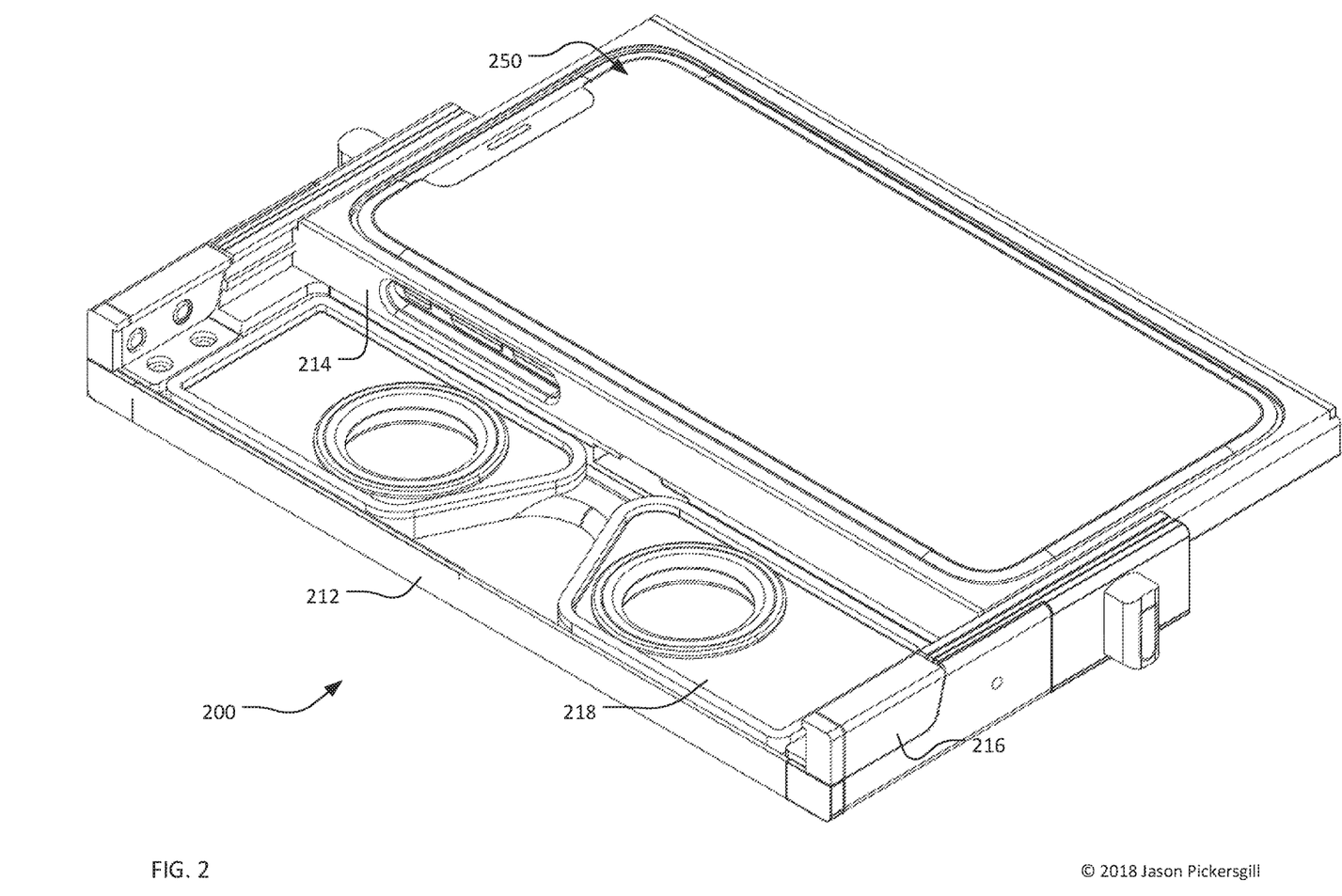
FIG. 2 is a perspective view of a collapsible viewer in a partially-extended position.

The sliding tray 114 is the portion of the collapsible viewer 100 that holds the mobile computing device 150. The sliding tray 114 moves to the up and right in this perspective view to expose the set of two lenses (FIG. 2). However, the sliding tray 114 is shown here in a collapsed position. When in the collapsed position, the primary function of the sliding tray 114 is to hold, for example frictionally, the mobile computing device 150. The sliding tray 114 is held frictionally as shown in FIG. 1, but may be held in place with clamps, by fully enveloping the mobile computing device 150, by "clicking" into place through the use of suitable male and female counterpart components, or by other methods known in the art of mobile phone cases.

The hinge 116 is a pivot point for the spring arm, discussed below to enable the set of two lenses to move from a fully collapsed position to a fully extended position. The hinge 116, when in this collapsed position, also fills a space that would otherwise be a gap in the collapsible viewer 100, which would allow dust and other debris to collect behind the mobile computing device 150 and in the same space that houses and protects the set of two lenses. As a result, the hinge 116 may incorporate a rubber or other material seal around its exterior to help to stop debris from entering behind the mobile computing device 150 or on the set of two lenses.

FIG. 2 is a perspective view of a collapsible viewer 200 in a partially-extended position. In this position, the case 212, the sliding tray 214, and hinge 216 are still visible. The mobile computing device 250 is also still within the sliding tray 214. These will generally not be discussed again with reference to FIG. 2. However, the set of two lenses 218 is now visible in its position which was behind the sliding tray 214 and within the case 212.

As can be seen, the hinge 216 remains in position, but is now exposed with the sliding tray 214 partially slid upwards and to the right in FIG. 2. This has revealed an enclosed area within the case 212 that houses the set of two lenses 218. Thus, when the collapsible viewer 200 is fully collapsed, as shown in FIG. 1, the set of two lenses 218 is fully-enveloped within the case 212 and behind the sliding tray 214. This helps to protect the set of two lenses from scratching and dust.

Simultaneously, the enclosure of the set of two lenses 218 within the case 212 and sliding tray 214 enables the set of two lenses to always be kept in close proximity with the mobile computing device 250 without significant extra burden of carrying them with the mobile computing device 250 at all times in a separate container or in one's hands.

Figure 3:
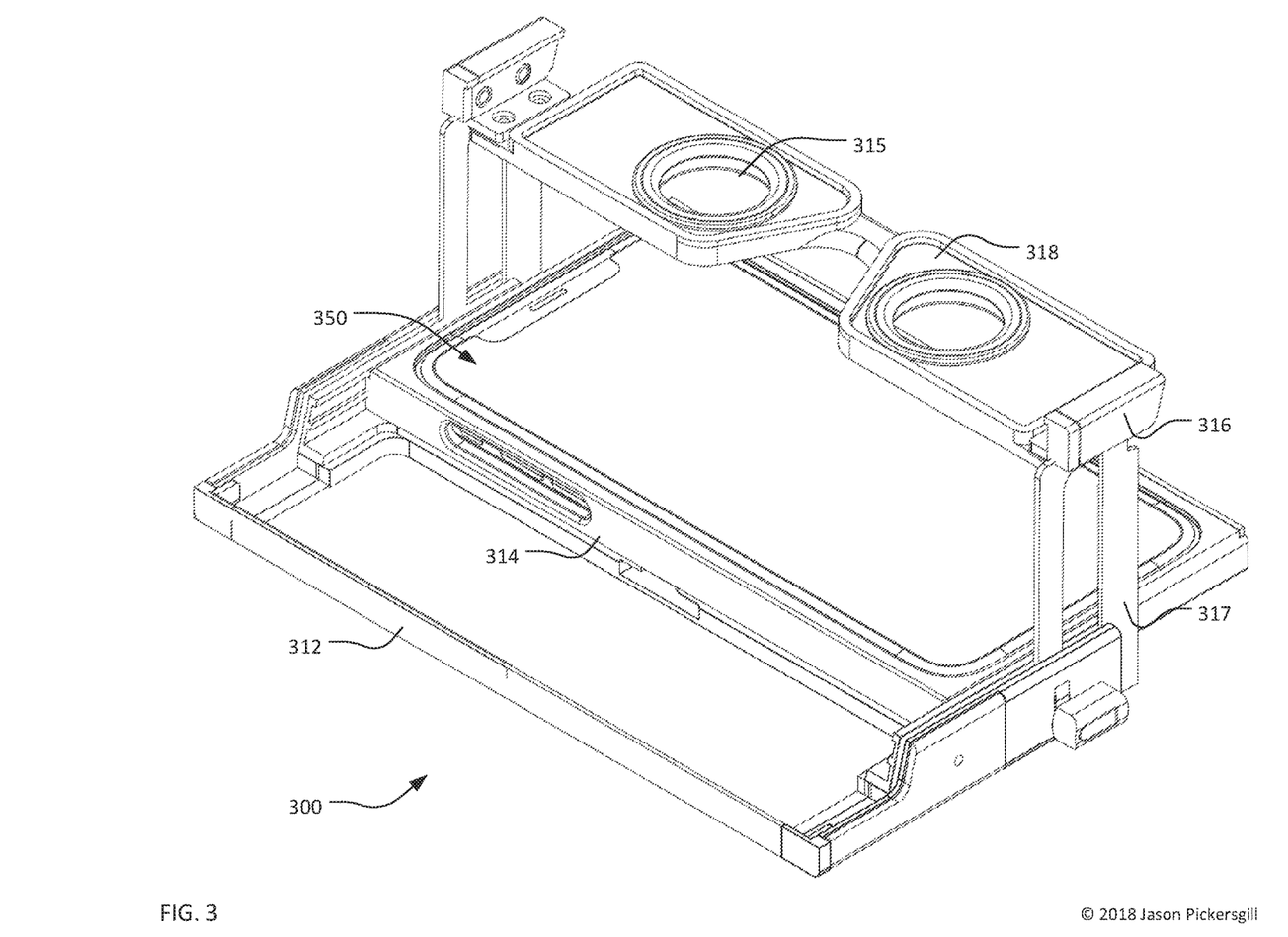
FIG. 3 is a perspective view of a collapsible viewer in an extended position.

FIG. 3 is a perspective view of a collapsible viewer 300 in an extended position. In this position, the case 312, the sliding tray 314, hinge 316, and the set of two lenses 318 are still visible. The mobile computing device 350 is also still within the sliding tray 314. These will generally not be discussed again with reference to FIG. 3.

The relative positioning of the set of two lenses 318 to the display of the mobile computing device 350 may be seen in FIG. 3. The sliding tray 314 has been fully-extended thereby allowing the spring arm 317 to cause the set of two lenses 318 to swing into position over the display of the mobile computing device 350. The set of two lenses 318 now has a visible lens 315 used for focusing a user's eyes on a display of the mobile computing device 350. The collapsible viewer 300 may be a general purpose one, intended for use with a wide variety of mobile computing devices.

Alternatively, the collapsible viewer 300 may be designed with a specific mobile computing device in mind—such that one collapsible viewer 300 is made for each of the most-popular types of mobile computing devices. In such cases, the overall design and proportions of the collapsible viewer may be designed such that the set of two lenses 318 position, when fully extended, is perfect with respect to two simultaneous three-dimensional images being shown on a display of the mobile computing device 350.

The spring arm 317 and its relationship to the hinge 316 may now be seen in this FIG. 3. Specifically, as the sliding tray 314 was extended, the spring arm 317 may be spring loaded such that the set of two lenses 318 moves into position over a display of the mobile computing device 350 automatically as the sliding tray 314 is slid to an open position. The hinge 316 allows this to occur while simultaneously maintaining the relative orientation of the set of two lenses 318 to a display of the mobile computing device 350.

In place of a spring arm 317 or in addition to a spring arm 317, the sliding tray 314 may incorporate a burr that extends outward toward the sides of the case 312 and sits between the two sides of the split spring arm 317. This burr may, as the sliding tray 314 is moved to an extended position, force the spring arm 317 to move with the sliding tray 314, thereby causing the set of two lenses 318 to move into a fully-extended position over a display of the mobile computing device 350. This may be preferable as it would avoid having to incorporate a spring into the spring arm 317. Likewise, in such a configuration, as the sliding tray 314 is closed, the spring arm 317 would be forced to move along with the closure, thereby forcing the set of two lenses 318 into position below the sliding tray and within the case 312. This may be accomplished through the use of a channel or trough within the sliding tray 314 sides or within the spring arm 317 and a counterpart burr.

Figure 4:
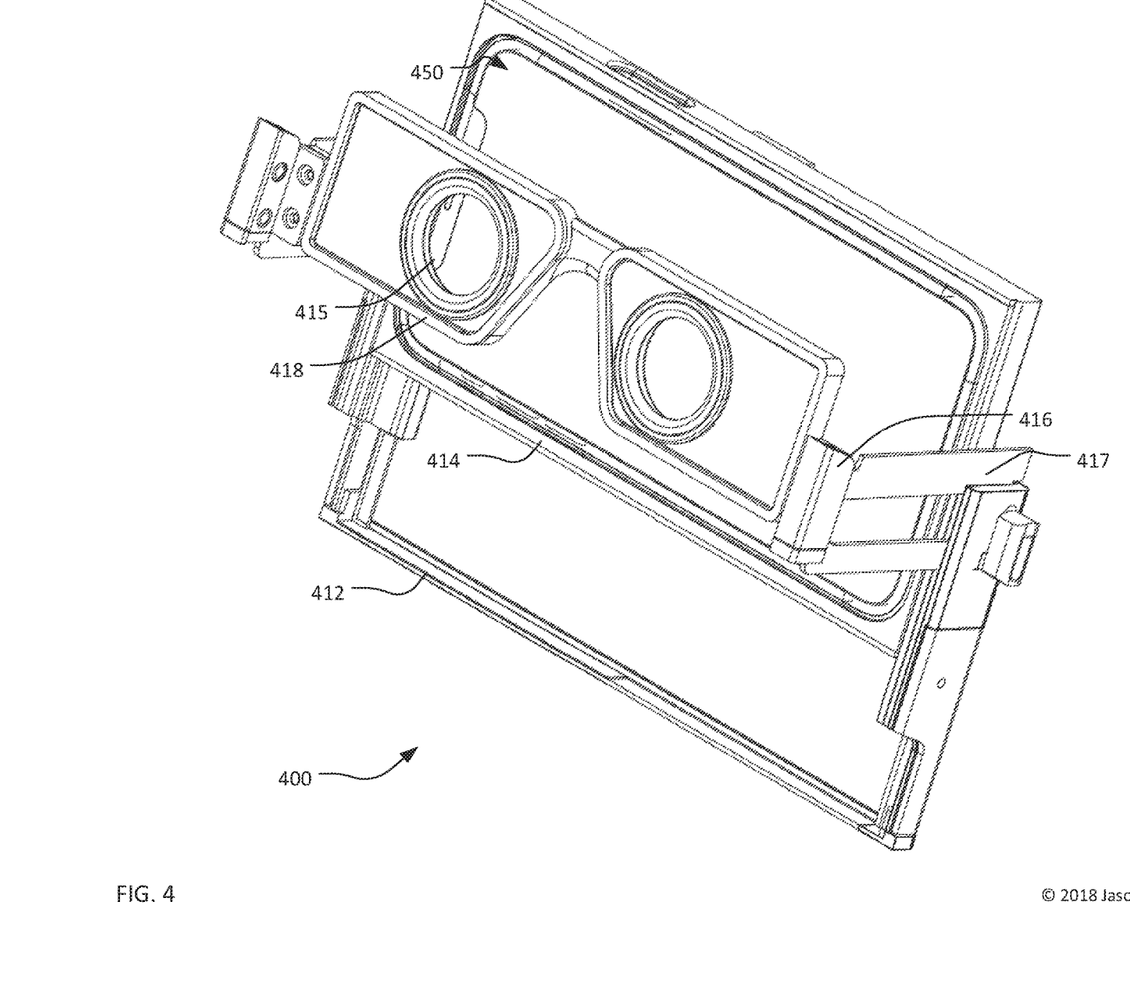
FIG. 4 is an alternative view of a collapsible viewer in an extended position.

FIG. 4 is an alternative view of a collapsible viewer 400 in an extended position. The same case 412, sliding tray 414, hinge 416, set of two lenses 418, lens 415, spring arm 417, and mobile computing device 450 are shown. The description of FIGS. 1-3 will not be repeated here.

The exterior of the case 412 may incorporate anti-slip materials, such as leather, rubber, molded plastics, foams, or other materials. These may help a user of the collapsible viewer 400 to maintain his or her grip while viewing AR or VR content on the mobile computing device 450. Similarly, the interior of the case 412 may incorporate foam or other anti-slip or anti-dust materials to ensure that the set of two lenses 418 remains protected and in place within the case 412. An example protective foam is shown in FIG. 4 within the case 412. Though not shown, this same material may be used on the back of the sliding tray 414.

Figure 5:
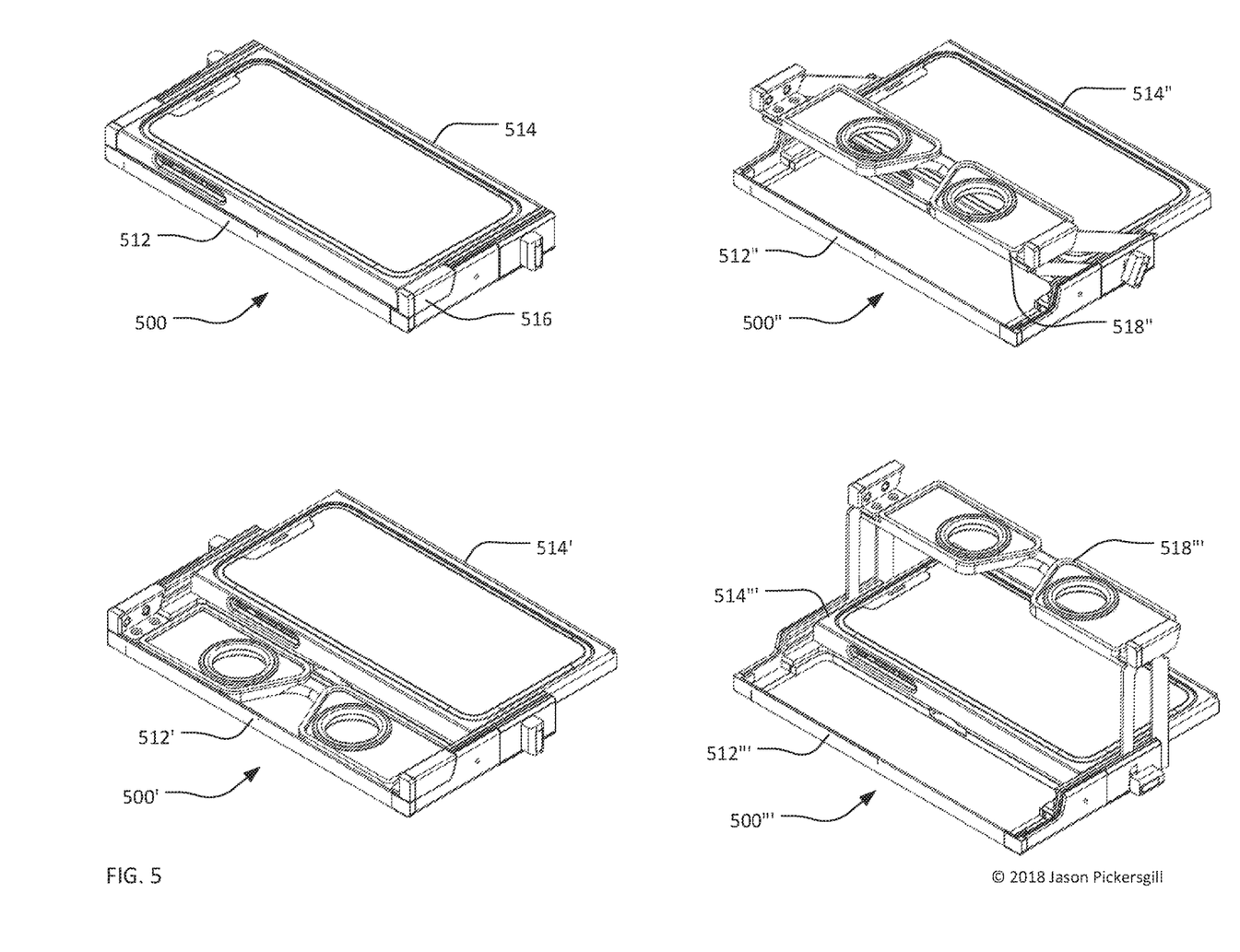
FIG. 5 is a series of images of a collapsible viewer in the process of being extended.

FIG. 5 is a series of images of a collapsible viewer 500 in the process of being extended. Collapsible viewer 500 shows the mobile computing device within the case 512, behind the sliding tray 514 with the hinge 416 in a fully collapsed position. Collapsible viewer 500' shows the case 512' open with the set of two lenses 518' visible and the sliding tray 514' partially opened.

Collapsible viewer 500" shows the set of two lenses 518" moving upward toward the front of the mobile computing device display and out of the case 512". The sliding tray 514" is now in a fully-extended position. Collapsible viewer 500''' shows the case 512''' with the set of two lenses 518''' fully-extended and the sliding tray 514''' still in position under the set of two lenses 518''' for viewing of AR and VR content.

Figure 6:
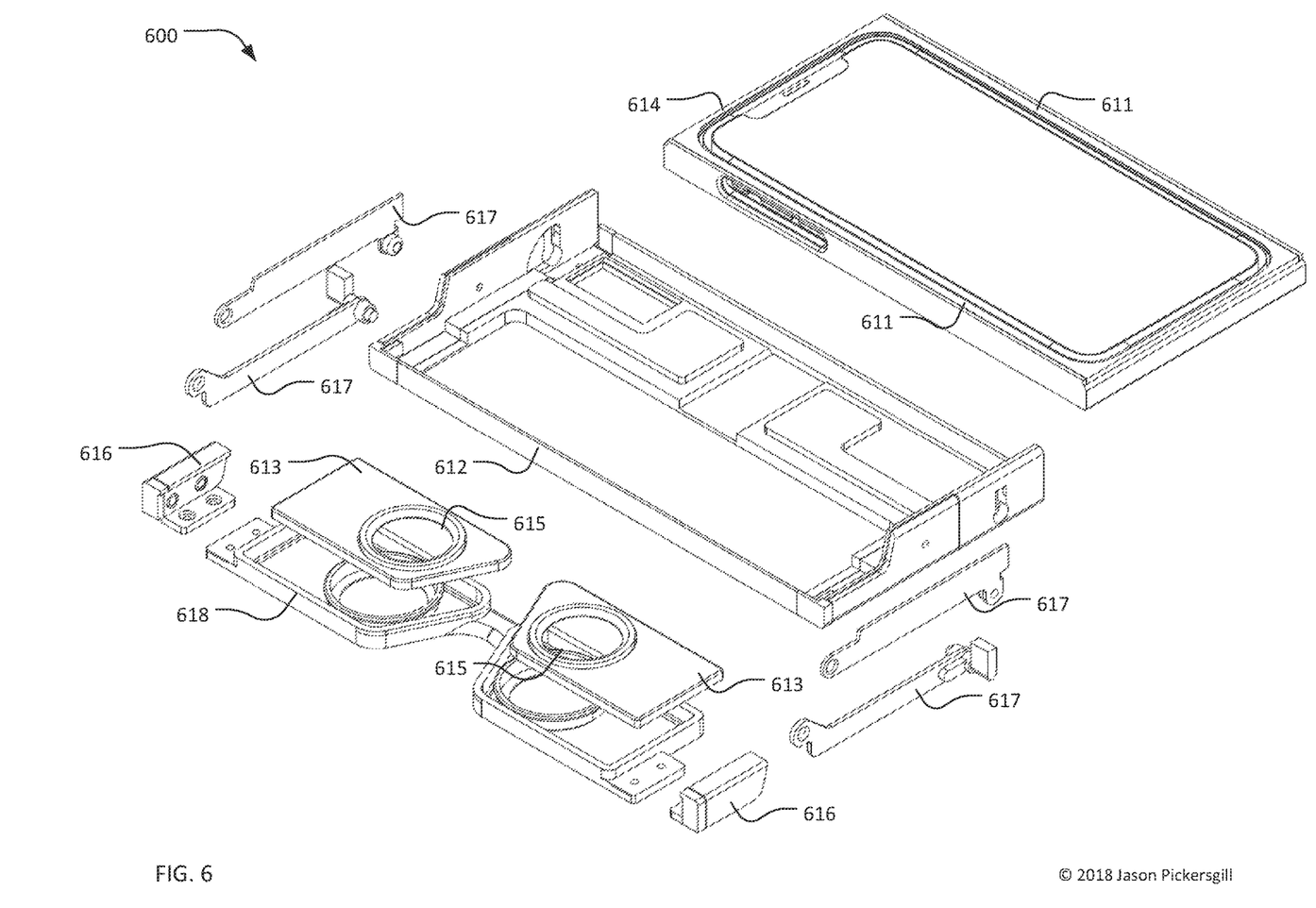
FIG. 6 is an exploded view of a collapsible viewer.

FIG. 6 is an exploded view of a collapsible viewer 600. The case 612, the sliding tray 614, the hinge 616, the set of two lenses 618 are shown, along with several subcomponents. Two lenses 615 are shown, along with lens housing 613. The sliding tray 614 incorporates decorative end caps 611. The spring arms 617 are shown exploded into two component parts. A mounting bracket 611 for the set of two lenses 618 is also shown which holds the set of two lenses in place relative to the spring arm 617.

Description of Processes

Figure 7:
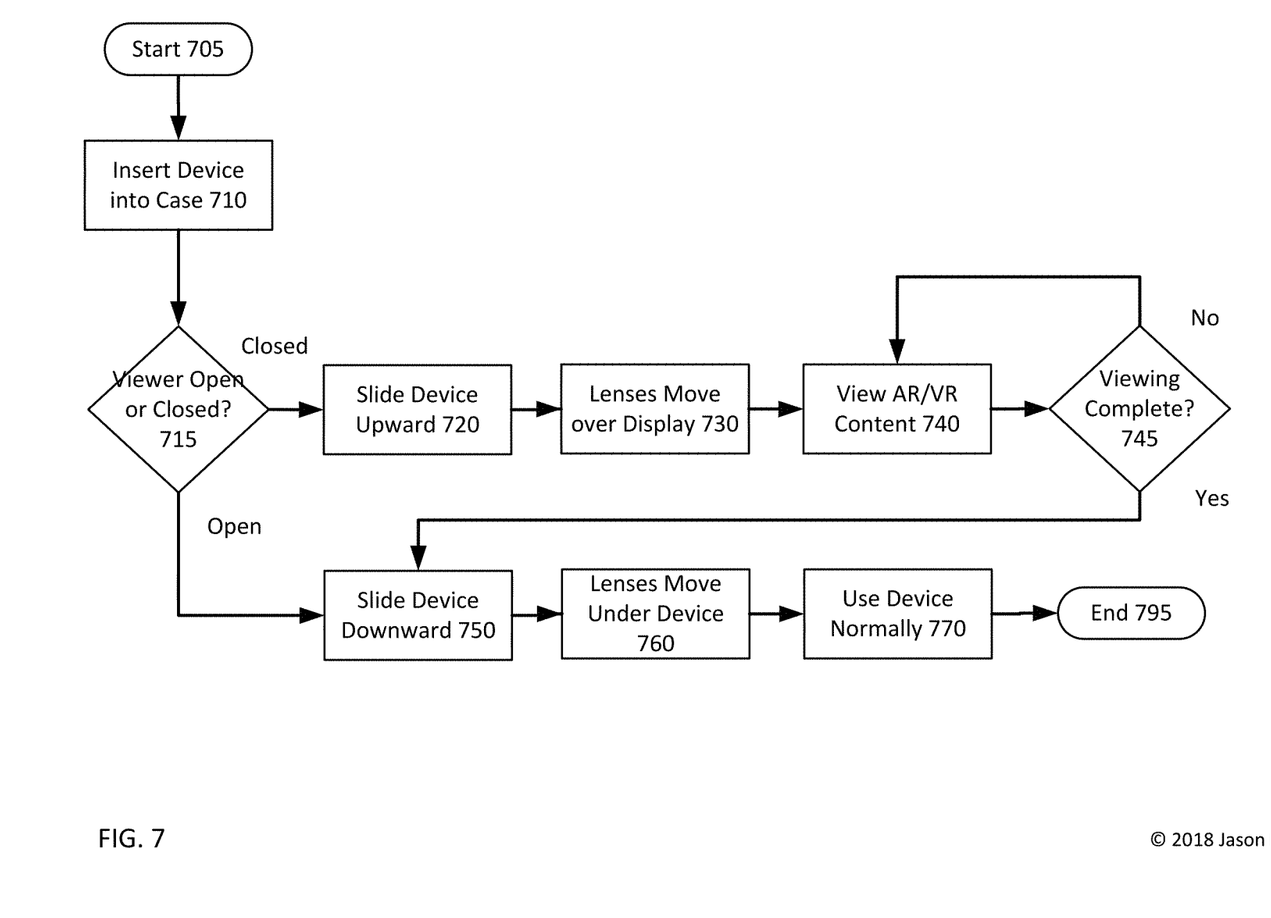
FIG. 7 is a flowchart of the processes of collapsing and extending a collapsible viewer.

Referring now to FIG. 7, a flowchart of the processes of collapsing and extending a collapsible viewer is shown. The process has a start 705 and an end 795, but the process is cyclical in nature. The process may take place as many times as a user wishes to transition between extended and collapsed positions.

First, a device is inserted into the case at 710. This is a mobile computing device. Though not strictly required for the collapsible viewer to collapse or extend, a mobile computing device is necessary for the collapsible viewer to function as a viewer.

Once a device is inserted at 710, a determination is made whether the viewer is open or closed at 715. If the viewer is closed (e.g. in a collapsed position), and assuming the user wishes to view VR or AR content, the device (within the sliding tray) is slid upward at 720. This causes the lenses to move over the display at 730 thereby enabling AR and VR content viewing on a display of the mobile computing device at 740.

Then, a determination is made whether viewing is complete at 745. If not ("no" at 745"), the user continues to view AR/VR content at 740 until viewing is complete. If viewing is complete ("yes" at 745), then the user may slide the mobile computing device (and the sliding tray) downward at 750, thereby causing the set of two lenses to move under the device 760. Once the set of two lenses are fully retracted, then the mobile computing device may be used normally at 770 and the process may end at 795.

If the mobile computing device is inserted while the collapsible viewer is in an open position at 715 and assuming the user wishes to use it normally, then the mobile computing device (and sliding tray) are slid downward at 750, the lenses move under the device at 760 and the device may begin being used normally at 770. The process may then end at 795.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A collapsible viewer comprising:
   a case for engaging a mobile computing device;
   an integral set of two lenses, mounted on a spring arm, capable of transitioning between a first collapsed position and a second extended position such that when the set of two lenses is in the first collapsed position, the set of two lenses is hidden within the case and when in the second extended position, the set of two lenses is positioned for viewing content displayed on the mobile computing device; and
   wherein, when in the first collapsed position, the spring arm and integral set of two lenses are disposed beneath a sliding tray frictionally engaging the mobile computing device.

2. The collapsible viewer of claim 1 wherein the case engages the mobile computing device by frictionally engaging a case interior with the exterior of the mobile computing device.

3. The collapsible viewer of claim 2 wherein the mobile computing device is engaged by a sliding tray, within which the mobile computing device is frictionally engaged.

4. The collapsible viewer of claim 1 wherein, when in the second extended position, the spring arm extends to position the integral set of two lenses over a display of the mobile computing device.

5. The collapsible viewer of claim 1 wherein, when the collapsible viewer is collapsed from the second extended position to the first collapsed position, movement of a sliding tray frictionally engaging the mobile computing device counteracts the spring arm to cause the integral set of two lenses to return to the first collapsed position underneath the sliding tray.

6. The collapsible viewer of claim 5 further comprising an exterior housing for enclosing the sliding tray, the integral set of two lenses, the spring arm, and the case.

7. A collapsible viewer comprising:
a case for engaging a mobile computing device, the case comprising a tray;
a set of two spring arms;
an integral set of two lenses, mounted on the set of two spring arms, capable of transitioning between a first collapsed position and a second extended position such that when the set of two lenses is in the first collapsed position, the spring arm and integral set of two lenses are disposed beneath a sliding tray frictionally engaging the mobile computing device such that the set of two lenses is hidden within the case and when in the second extended position, the set of two lenses is positioned for viewing content displayed on the mobile computing device;
an exterior housing for enclosing the case, the set of two spring arms and the integral set of two lenses when the set of two lenses is in the first collapsed position.

8. The collapsible viewer of claim 7 wherein the case engages the mobile computing device by frictionally engaging a case interior with the exterior of the mobile computing device.

9. The collapsible viewer of claim 8 wherein the tray engaging the mobile computing device is a sliding tray, within which the mobile computing device is frictionally engaged.

10. The collapsible viewer of claim 7 wherein, when in the second extended position, the spring arm extends to position the integral set of two lenses over a display of the mobile computing device.

11. The collapsible viewer of claim 7 wherein, when the collapsible viewer is collapsed from the second extended position to the first collapsed position, movement of the tray frictionally engaging the mobile computing device counteracts the spring arm to cause the integral set of two lenses to return to the first collapsed position underneath the tray.

12. The collapsible viewer of claim 11 further comprising an exterior housing for enclosing the tray, the integral set of two lenses, the spring arm, and the case.

13. A collapsible viewer comprising:
a case comprising a tray for engaging a mobile computing device; and
an integral set of two lenses capable of transitioning between a first collapsed position and a second extended position such that when the set of two lenses is in the first collapsed position, the set of two lenses is hidden within the case and when in the second extended position, the set of two lenses is positioned for viewing content displayed on the mobile computing device.

* * * * *